(12) United States Patent  
Huang et al.

(10) Patent No.: US 12,510,576 B2  
(45) Date of Patent: Dec. 30, 2025

(54) ANALYSIS METHOD AND APPARATUS FOR HIGH-FREQUENCY QRS WAVEFORM CURVE, COMPUTER DEVICE AND STORAGE MEDIUM

(71) Applicant: HyperBio Biological Technology Co., Ltd, Changsha (CN)

(72) Inventors: Qinghong Huang, Changsha (CN); Qingxi Huang, Changsha (CN); Neng Zuo, Changsha (CN); Xiaoqin Li, Changsha (CN)

(73) Assignee: HyperBio Biological Technology Co., Ltd, Changsha (CN)

( * ) Notice: Subject to any disclaimer, the term of this patent is extended or adjusted under 35 U.S.C. 154(b) by 0 days.

(21) Appl. No.: 18/872,957

(22) PCT Filed: Apr. 28, 2023

(86) PCT No.: PCT/CN2023/091608  
§ 371 (c)(1),  
(2) Date: Dec. 9, 2024

(87) PCT Pub. No.: WO2023/236689  
PCT Pub. Date: Dec. 14, 2023

(65) Prior Publication Data  
US 2025/0264511 A1  Aug. 21, 2025

(30) Foreign Application Priority Data  
Jun. 9, 2022  (CN) .......................... 202210644560.5

(51) Int. Cl.  
*G16H 50/30* (2018.01)  
*A61B 5/366* (2021.01)  
(Continued)

(52) U.S. Cl.  
CPC ......... *G01R 29/0273* (2013.01); *G01R 29/04* (2013.01); *G16H 50/30* (2018.01)

(58) Field of Classification Search  
CPC .......................... G01R 29/0273; G01R 29/04; G01R 29/0276; G01R 29/033; G01R 29/02;  
(Continued)

(56) References Cited

U.S. PATENT DOCUMENTS

2010/0114201 A1* 5/2010 Donofrio ............. A61N 1/3706  
600/301

FOREIGN PATENT DOCUMENTS

CA   2453504 C  * 12/2009  ............. A61B 5/349  
CN   2273467 Y  *  1/1998  ............... G05F 1/14  
(Continued)

OTHER PUBLICATIONS

Journal literature names: Chinese Excellent Boshuji academic paper full-text database (Master) information science and technology edition, Publication date: May 15, 2014 Author: Meili Chen Title: research and implementation of moving ECG signal processing and waveform automatic recognition.  
(Continued)

*Primary Examiner* — Jeffrey P Aiello  
(74) *Attorney, Agent, or Firm* — Volpe Koenig

(57) ABSTRACT

A high-frequency QRS waveform curve analysis method comprises: acquiring a high-frequency QRS waveform curve; selecting the high-frequency QRS waveform curve in a preset time period as a reference waveform curve; selecting a point with the minimum root-mean-square voltage on the reference waveform curve as a first reference point; selecting a second reference point meeting a first selection condition and a third reference point meeting a second selection condition, wherein the time of the first reference point is later than that of the second reference point and  
(Continued)

earlier than the third reference point; based on the first reference point and the second reference point, determining an amplitude falling relative value; based on the first reference point and the third reference point, determining an amplitude rising relative value. If the amplitude falling rising relative values meet a preset condition, determining reference information according to the high-frequency QRS waveform curve.

20 Claims, 4 Drawing Sheets

(51) Int. Cl.
*G01R 29/027* (2006.01)
*G01R 29/04* (2006.01)

(58) Field of Classification Search
CPC . G01R 13/34; G06F 2218/12; G06F 2218/06; G06F 2218/10; G06F 18/00; A61B 5/366; A61B 5/0205; A61B 5/7235; A61B 5/308; G16H 50/30; G16H 50/20; G16H 30/20; G01N 29/07
USPC ...... 73/598; 324/103 P, 605, 76.13; 600/509, 600/323, 529, 300, 324, 364, 513, 515, 600/554; 702/57, 19, 77, 66, 75, 190, 1, 702/189, 70, 67, 127, 21

See application file for complete search history.

(56) References Cited

FOREIGN PATENT DOCUMENTS

| | | | | | |
|---|---|---|---|---|---|
| CN | 101361652 | A | * | 2/2009 | ........... A61B 5/0215 |
| CN | 111248895 | A | | 6/2020 | |
| CN | 113712569 | A | * | 11/2021 | ............. A61B 5/318 |
| CN | 114052746 | A | * | 2/2022 | ............. A61B 5/318 |
| CN | 114732418 | A | | 7/2022 | |
| CN | 114742113 | A | | 7/2022 | |
| CN | 114742114 | A | | 7/2022 | |
| CN | 114788703 | A | | 7/2022 | |
| RU | 2376932 | C1 | * | 12/2009 | ............... A61B 5/04 |

OTHER PUBLICATIONS

Journal literature names: 2021 International Conference on Advancements in Electrical, Electronics, Communication, Computing and Automation (ICAECA), Publication date: Jan. 20, 2022 Author: M. Sundar Prakash Balaji and so forth Title: Revisiting Derivative Based Methods on QRS Detections from an ECG Signal.

* cited by examiner

ANALYSIS METHOD AND APPARATUS FOR HIGH-FREQUENCY QRS WAVEFORM CURVE, COMPUTER DEVICE AND STORAGE MEDIUM

CROSS REFERENCE TO RELATED APPLICATIONS

The disclosure claims the benefit of priority to Chinese Patent Application No. 2022106445605, filed with the Chinese Patent Office on Jun. 9, 2022 and entitled "ANALYSIS METHOD AND APPARATUS FOR HIGH-FREQUENCY QRS WAVEFORM CURVE, COMPUTER DEVICE, AND STORAGE MEDIUM", which is incorporated herein in its entirety by reference.

FIELD OF THE INVENTION

The disclosure relates to an analysis method and apparatus for a high-frequency QRS waveform curve, a computer device, and a storage medium.

BACKGROUND OF THE INVENTION

As people's living standards keep improving and work pressure keeps escalating, heart disease becomes more prevalent among a younger age group and more common, and heart health problems arouse increasing attention. Thus, how to accurately identify a heart health status is a noteworthy problem.

At present, the heart health status is qualitatively and generally identified on the basis of a change of a ST-T segment in an electrocardiogram (ECG), but identification accuracy of the heart health status is low. Thus, invasive methods such as coronary angiography are required to more accurately identify the heart health status.

SUMMARY OF THE INVENTION

According to various examples disclosed in the disclosure, an analysis method and apparatus for a high-frequency QRS waveform curve, a computer device, and a storage medium are provided.

The analysis method for a high-frequency QRS waveform curve includes:
  acquiring a high-frequency QRS waveform curve corresponding to exercise electrocardiogram data;
  selecting a high-frequency QRS waveform curve in a preset time period as a reference waveform curve;
  selecting a point, of which a root-mean-square voltage is smallest, on the reference waveform curve as a first reference point;
  selecting a second reference point satisfying a first selection condition and a third reference point satisfying a second selection condition from the reference waveform curve, where time of the second reference point is earlier than time of the first reference point, and time of the third reference point is later than the time of the first reference point;
  determining an amplitude falling relative value on the basis of respective root-mean-square voltages of the first reference point and the second reference point;
  determining an amplitude rising relative value on the basis of respective root-mean-square voltages of the first reference point and the third reference point; and
  determining corresponding reference information according to the high-frequency QRS waveform curve in a case that the amplitude falling relative value and the amplitude rising relative value satisfy preset conditions.

In an example, the reference information includes first reference information. The determining corresponding reference information according to the high-frequency QRS waveform curve includes:
  determining an amplitude falling absolute value on the basis of the respective root-mean-square voltages of the first reference point and the second reference point;
  determining an amplitude rising absolute value on the basis of the respective root-mean-square voltages of the first reference point and the third reference point; and
  determining the first reference information according to the amplitude rising absolute value and the amplitude falling absolute value.

In an example, the determining the first reference information according to the amplitude rising absolute value and the amplitude falling absolute value includes:
  determining the amplitude rising duration on the basis of the respective time of the first reference point and the third reference point; and
  determining the first reference information according to a ratio of the amplitude rising absolute value to the amplitude falling absolute value, and the amplitude rising duration.

In an example, the determining the first reference information according to a ratio of the amplitude rising absolute value to the amplitude falling absolute value, and the amplitude rising duration includes:
  determining an area of a waveform falling region according to the second reference point, the third reference point, and the reference waveform curve; and
  determining the first reference information according to a ratio of the amplitude rising absolute value to the amplitude falling absolute value, the amplitude rising duration, and the area of the waveform falling region.

In an example, the reference information further includes second reference information. The determining corresponding reference information according to the high-frequency QRS waveform curve includes:
  determining a lead positive indicator of a corresponding electrocardiogram lead according to the high-frequency QRS waveform curve;
  determining a number of positive leads according to the lead positive indicator;
  determining a total number of high-frequency QRS waveform curves of which corresponding lead positive indicators indicate positive and corresponding amplitude falling relative values and amplitude rising relative values satisfy the preset conditions; and
  determining the second reference information according to the total number and the number of the positive leads.

In an example, the preset conditions include: the amplitude falling relative value is greater than or equal to a first preset threshold, and the amplitude rising relative value is greater than or equal to a second preset threshold. The first preset threshold is determined by at least one of the root-mean-square voltage of the second reference point, a weight, an age, and a gender of a subject, and a load grade. The second preset threshold is determined by at least one of the root-mean-square voltage of the first reference point, a weight, an age, and a gender of a subject, and a load grade.

An analysis apparatus for a high-frequency QRS waveform curve includes:

an acquiring module used to acquire a high-frequency QRS waveform curve corresponding to exercise electrocardiogram data;

a selecting module used to select a high-frequency QRS waveform curve in a preset time period as a reference waveform curve; where the selecting module is further used to select a point, of which a root-mean-square voltage is smallest, on the reference waveform curve as a first reference point; and the selecting module is further used to select a second reference point satisfying a first selection condition and a third reference point satisfying a second selection condition from the reference waveform curve, where time of the second reference point is earlier than time of the first reference point, and time of the third reference point is later than the time of the first reference point; and a reference information determining module used to determine an amplitude falling relative value on the basis of respective root-mean-square voltages of the first reference point and the second reference point; where the reference information determining module is further used to determine an amplitude rising relative value on the basis of respective root-mean-square voltages of the first reference point and the third reference point; and the reference information determining module is further used to determine corresponding reference information according to the high-frequency QRS waveform curve in a case that the amplitude falling relative value and the amplitude rising relative value satisfy preset conditions.

In an example, the reference information includes first reference information. The reference information determining module is further used to determine an amplitude falling absolute value on the basis of the respective root-mean-square voltages of the first reference point and the second reference point, determine an amplitude rising absolute value on the basis of the respective root-mean-square voltages of the first reference point and the third reference point, and determine the first reference information according to the amplitude rising absolute value and the amplitude falling absolute value.

In an example, the reference information determining module is further used to determine the amplitude rising duration on the basis of the respective time of the first reference point and the third reference point, and determine the first reference information according to a ratio of the amplitude rising absolute value to the amplitude falling absolute value, and the amplitude rising duration.

In an example, the reference information determining module is further used to determine the area of the waveform falling region according to the second reference point, the third reference point, and the reference waveform curve; and determine the first reference information according to a ratio of the amplitude rising absolute value to the amplitude falling absolute value, the amplitude rising duration, and the area of the waveform falling region.

In an example, the reference information further includes second reference information. The reference information determining module is further used to determine a lead positive indicator of a corresponding electrocardiogram lead according to the high-frequency QRS waveform curve, determine a number of positive leads according to the lead positive indicator, determine a total number of high-frequency QRS waveform curves of which corresponding lead positive indicators indicate positive, and corresponding amplitude falling relative values and amplitude rising relative values satisfy the preset conditions, and determine the second reference information according to the total number and the number of the positive leads.

In an example, the preset conditions include: the amplitude falling relative value is greater than or equal to a first preset threshold, and the amplitude rising relative value is greater than or equal to a second preset threshold. The first preset threshold is determined by at least one of the root-mean-square voltage of the second reference point, a weight, an age, and a gender of a subject, and a load grade. The second preset threshold is determined by at least one of the root-mean-square voltage of the first reference point, a weight, an age, and a gender of a subject, and a load grade.

A computer device includes a memory and one or more processors. A computer-readable instruction is stored in the memory. When the computer-readable instruction is executed by the processors, the steps of the analysis method for a high-frequency QRS waveform curve provided in any one of examples of the disclosure are implemented.

One or more non-volatile storage media storing computer-readable instructions are provided. When the computer-readable instructions are executed by one or more processors, the one or more processors are caused to implement the steps of the analysis method for a high-frequency QRS waveform curve provided in any one of examples of the disclosure.

Details of one or more examples of the disclosure will be provided in the following accompanying drawings and descriptions. Other features and advantages of the disclosure will become apparent from the description, accompanying drawings, and claims.

BRIEF DESCRIPTION OF DRAWINGS

To describe technical solutions in examples of the disclosure more clearly, accompanying drawings required to be used in the examples will be briefly introduced below. Apparently, the accompanying drawings in the following descriptions show merely some examples of the disclosure. Those of ordinary skill in the art would also be able to derive other accompanying drawings according to these accompanying drawings without making creative efforts.

DETAILED DESCRIPTION OF THE EMBODIMENTS

To make technical solutions and advantages of the disclosure clearer and more understandable, the disclosure will be further described in detail below in combination with accompanying drawings and examples. It should be understood that the particular examples described herein are merely used to explain the disclosure, and are not used to limit the disclosure.

An analysis method for a high-frequency QRS waveform curve provided in the disclosure may be applied to a terminal, or a server, or may be applied to an interactive system including a terminal and a server and implemented through an interaction between the terminal and the server, which is not specifically limited herein. The terminal may be but is not limited to various personal computers, notebook computers, smart phones, tablet computers, electrocardiogram monitoring devices, and portable wearable devices. The server may be implemented by an independent server or a server cluster composed of a plurality of servers.

Figure 1:
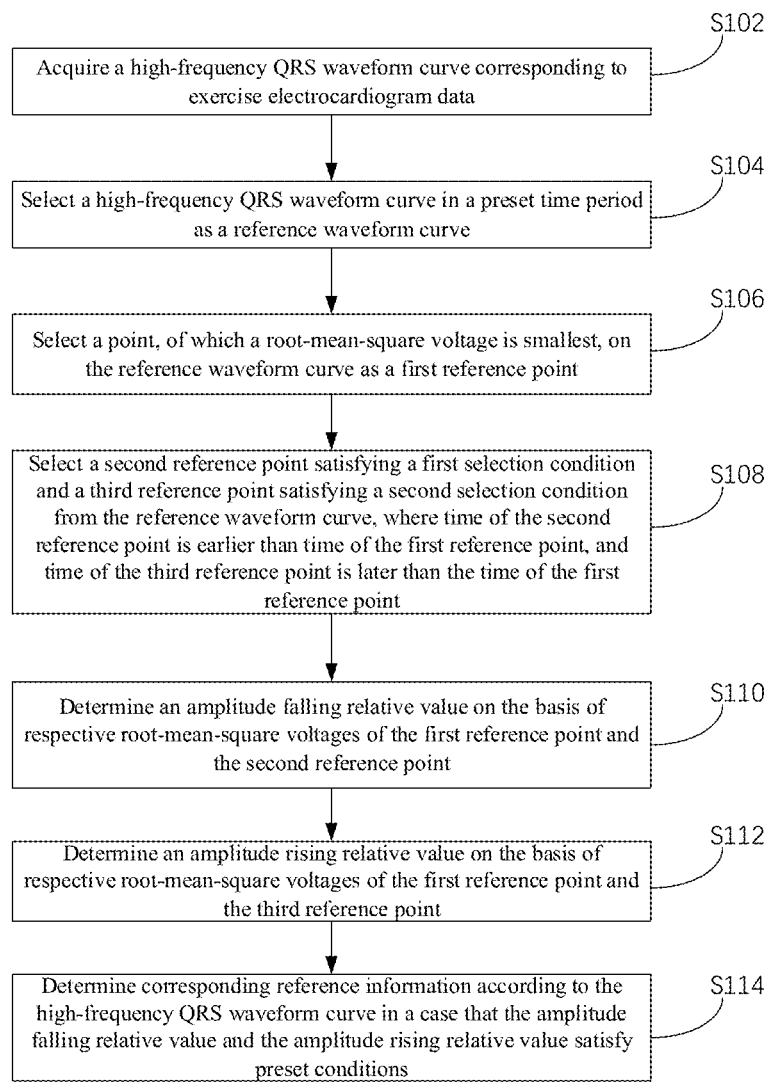
FIG. 1 is a schematic flow diagram of an analysis method for a high-frequency QRS waveform curve according to one or more examples.

In some examples, as shown in FIG. 1, an analysis method for a high-frequency QRS waveform curve is provided. An instance in which the method is applied to a server is taken for description. The method specifically includes steps as follows:

S102: a high-frequency QRS waveform curve corresponding to exercise electrocardiogram data is acquired.

Exercise electrocardiogram data refers to electrocardiogram data collected in a stress electrocardiogram testing process. The stress electrocardiogram testing is an electrocardiogram testing method used to collect electrocardiogram data of a subject by increasing a heart load through a certain amount of exercise, and analyze a heart health status of the subject on the basis of the collected electrocardiogram data. The method is widely used in testing of heart disease and cardiovascular disease. The exercise electrocardiogram data includes a plurality of QRS complexes reflecting changes of depolarization potentials and time of left and right ventricles. Each QRS complex is a collection of a Q-wave, an R-wave and an S-wave in an electrocardiogram. On the basis of the QRS complex in the exercise electrocardiogram data, a corresponding high-frequency QRS waveform curve can be obtained through analysis. The high-frequency QRS waveform curve is used to represent a variation trend of a root-mean-square voltage of a high-frequency component of a QRS complex of the subject with time in a whole stress electrocardiogram testing process, that is, used to reflect an energy change trend in the whole stress electrocardiogram testing process. The high-frequency QRS waveform curve is presented by a high-frequency QRS waveform diagram. In the high-frequency QRS waveform diagram, an abscissa represents time, and the time corresponds to testing time of the stress electrocardiogram testing process, and has a unit of min (minute). An ordinate represents a root-mean-square voltage (RMS voltage), and the root-mean-square voltage can be further understood as an intensity or amplitude, and has a unit of uV (microvolt).

Specifically, corresponding exercise electrocardiogram data of a subject in the whole stress electrocardiogram testing process is acquired. A high-frequency component of a QRS complex in the exercise electrocardiogram data is analyzed, and a corresponding high-frequency QRS waveform curve is obtained. The exercise electrocardiogram data includes an electrocardiogram (ECG) corresponding to each heartbeat of the subject in the whole stress electrocardiogram testing process. The ECG includes a QRS complex. The exercise electrocardiogram data is divided into a plurality of electrocardiogram data subsets in a time sequence according to a preset moving step size and by using a window function. Each electrocardiogram data subset includes ECGs corresponding to a plurality of heartbeats. The ECGs or QRS complexes corresponding to a plurality of heartbeats included in each electrocardiogram data subset are aligned, averaged and band-pass filtered, and a corresponding high-frequency QRS complex (a high-frequency wave band of a QRS complex) is obtained. A root-mean-square of the high-frequency QRS complex is computed, and a corresponding root-mean-square voltage is obtained to serve as a root-mean-square voltage/intensity/amplitude corresponding to the electrocardiogram data subset. Curve smoothing is carried out on the root-mean-square voltage/intensity/amplitude corresponding to each electrocardiogram data subset in a time sequence, and a high-frequency QRS waveform curve corresponding to the exercise electrocardiogram data is obtained.

It can be understood that a window length and a preset moving step size of the window function can be customized according to actual requirements. For instance, a window length is set as 10 seconds, a preset moving step size is set as 10 seconds or one heartbeat cycle, where one heartbeat cycle refers to a time interval between two adjacent heartbeats, which is not specifically limited herein. The time sequence refers to a sequence of time according to signal acquisition time/testing time of stress electrocardiogram testing process.

In some examples, the stress electrocardiogram testing process includes a plurality of phases, which may specifically include three phases in sequence, that is, a rest phase, an exercise phase, and a recovery phase. The exercise electrocardiogram data includes electrocardiogram data of each phase. It can be understood that division of phases is not limited to the above description, and can be performed according to actual situations.

In some examples, in the stress electrocardiogram testing process, 10 electrode plates distributed at a chest and limbs of a human body may be used to form 12 electrocardiogram leads (such as V1, V2, V3, V4, V5, V6, I, II, III, aVL, aVF, and aVR). Moreover, 12 groups of electrocardiogram data are output correspondingly. Then, exercise electrocardiogram data corresponding to the whole stress electrocardiogram testing process is obtained. It can be understood that the 10 electrode plates are only taken as an instance, and are not used to specifically limit a number of electrode plates. The number of the electrode plates can be dynamically determined according to actual requirements. For instance, more or fewer electrode plates may be arranged. Thus, the exercise electrocardiogram data includes electrocardiogram data corresponding to at least one electrocardiogram lead. A high-frequency QRS waveform curve corresponding to each electrocardiogram lead is obtained by analyzing a high-frequency component of a QRS complex in the electrocardiogram data corresponding to each electrocardiogram lead.

S104: a high-frequency QRS waveform curve in a preset time period is selected as a reference waveform curve.

The preset time period may be a time interval determined by a preset starting time point and a preset ending time point, or may be a time interval determined by a preset starting time point and preset duration, for instance, a time interval that takes a starting point of an exercise phase as a starting time point and has preset duration of three minutes. If the exercise phase corresponds to a time range from 0 min to 6 min in the high-frequency QRS waveform curve, the preset time period may be a time interval represented by [0, 3 min] for instance, which takes a time point of 0 min as a starting time point and a time point of 3 min as an ending time point. The reference waveform curve is a curve of the high-frequency QRS waveform curve in a preset time period. Time of each point on the reference waveform curve is in the preset time period. Respective time of a starting point and an ending point of the reference waveform curve are a starting time point and an ending time point of the preset time period respectively.

S106: a point, of which a root-mean-square voltage is smallest, on the reference waveform curve is selected as a first reference point.

Specifically, a position of each point on the reference waveform curve is determined by time and a root-mean-square voltage of the point. Root-mean-square voltages of points on the reference waveform curve are traversed in a time sequence. A point of which a root-mean-square voltage is smallest is selected on the reference waveform curve on the basis of the traversed root-mean-square voltages. The selected point is taken as the first reference point.

S108: A second reference point satisfying a first selection condition and a third reference point satisfying a second selection condition are selected from the reference waveform curve. Time of the second reference point is earlier than time of the first reference point. Time of the third reference point is later than the time of the first reference point.

The first selection condition is a constraint condition for selection the second reference point from the reference waveform curve, and specifically may be a starting point of the reference waveform curve, or a point, of which time is earlier than/less than that of the first reference point and a root-mean-square voltage is greatest, on the reference waveform curve. The second selection condition is a constraint condition for selection the third reference point from the reference waveform curve, and specifically may be an ending point of the reference waveform curve, or a first inflection point, of which time is later than/greater than that of a first reference point, on the reference waveform curve. The inflection point refers to a point at which a curve changes upwards or downwards, that is, a boundary point between a concave arc and a convex arc on the reference waveform curve. If there are a plurality of inflection points, of which time is later than time of the first reference point, on the reference waveform curve, an inflection point, of which time is earliest, of the plurality of inflection points is determined as the first inflection point.

In some examples, if there are a plurality of points satisfying the first selection condition on the reference waveform curve, a point, of which time is latest, of the plurality of points can be selected as the second reference point. If there is no inflection point, of which time is later than time of the first reference point, on the reference waveform curve, an ending point of the reference waveform curve is determined as the third reference point.

Figure 2:
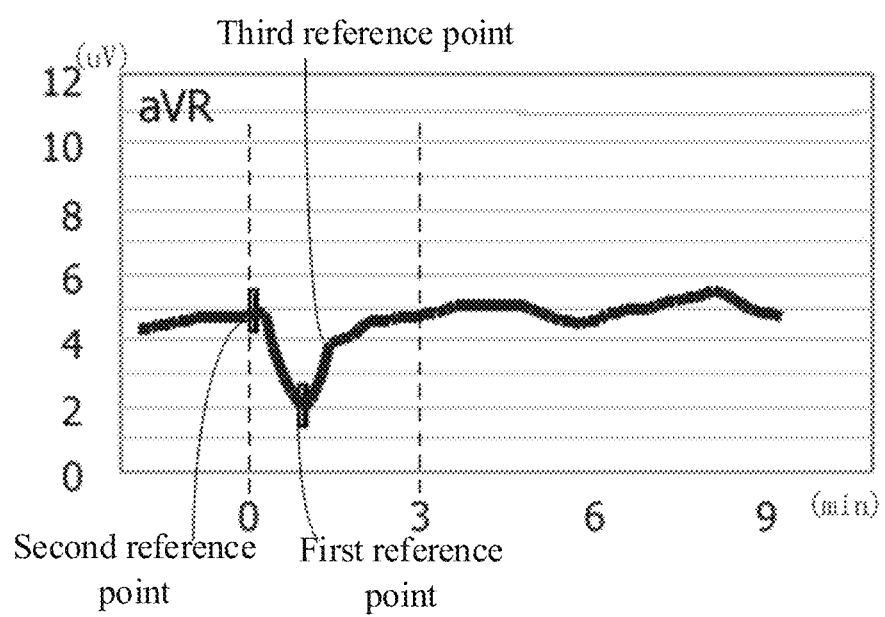
FIG. 2 is a schematic diagram of selecting reference points on the basis of a reference waveform curve of a high-frequency QRS waveform curve according to one or more examples.

In some examples, FIG. 2 provides a schematic diagram of selecting reference points on the basis of a reference waveform curve of a high-frequency QRS waveform curve. As shown in FIG. 2, a high-frequency QRS waveform curve corresponding to electrocardiogram lead aVR is displayed in a high-frequency QRS waveform diagram. An abscissa represents time having a unit of min, and an ordinate represents a root-mean-square voltage/amplitude having a unit of uV. The exercise phase corresponds to a time range from 0 min to 6 min on the high-frequency QRS waveform curve. The reference waveform curve is a curve (that is, a curve formed by time between 0 min and 3 min) between two dotted lines on the high-frequency QRS waveform curve. The first reference point is a point, of which the root-mean-square voltage is smallest, on the reference waveform curve. The second reference point is the starting point of the reference waveform curve. The third reference point is the first inflection point, of which time is later than time of the first reference point, on the reference waveform curve. It can be understood that the high-frequency QRS waveform curve and correspondingly selected reference points shown in FIG. 2 are only used as an instance, and are not used for specific limitation.

S110: an amplitude falling relative value is determined on the basis of respective root-mean-square voltages of the first reference point and the second reference point.

Specifically, respective root-mean-square voltages of the first reference point and the second reference point are acquired on the basis of the reference waveform curve. A difference between the root-mean-square voltage of the second reference point and the root-mean-square voltage of the first reference point is computed, and an amplitude falling absolute value is obtained. A ratio of the amplitude falling absolute value to the root-mean-square voltage of the second reference point is determined as an amplitude falling relative value of the reference waveform curve.

S112: an amplitude rising relative value is determined on the basis of respective root-mean-square voltages of the first reference point and the third reference point.

Specifically, respective root-mean-square voltages of the first reference point and the third reference point are acquired on the basis of the reference waveform curve. A difference between the root-mean-square voltage of the third reference point and the root-mean-square voltage of the first reference point is computed, and an amplitude rising absolute value is obtained. A ratio of the amplitude rising absolute value to the root-mean-square voltage of the first reference point is determined as an amplitude rising relative value of the reference waveform curve.

S114: corresponding reference information is determined according to the high-frequency QRS waveform curve in a case that the amplitude falling relative value and the amplitude rising relative value satisfy preset conditions.

The preset condition is a constraint condition for determining whether to determine the corresponding reference information on the basis of the high-frequency QRS waveform curve. The preset condition may specifically include: the amplitude falling relative value of the reference waveform curve is greater than or equal to a first preset threshold, and the amplitude rising relative value of the reference waveform curve is greater than or equal to a second preset threshold. Reference information is used to represent an establishment degree of collateral circulation. For instance, if the reference information indicates "excellent", it is indicated that favorable collateral circulation is established. If the reference information indicates "good", it is indicated that an establishment degree of collateral circulation is average. If the reference information indicates "poor", it is indicated that an establishment degree of collateral circulation is relatively poor. It can be understood that the reference information representing the establishment degree of the collateral circulation by grades such as "excellent", "good", and "poor" is used only as an instance, and is not used for specific limitation. For instance, more grades, such as "excellent+", "excellent−", and "good+", may be set. Moreover, numerical values or grades may be used for representation. For instance, numerical values in a numerical interval [0, 1] or [0, 100] are used for representation. For another instance, grades corresponding to letters such as A, B, C . . . are used for representation. The higher of the letter ranking in alphabetical order, the higher a representation grade. The greater a numerical value or the higher a grade, the better an establishment degree of the collateral circulation, which is not specifically limited herein.

Specifically, the amplitude falling relative value and the amplitude rising relative value match the preset conditions. If the amplitude falling relative value and the amplitude rising relative value satisfy the preset conditions, corresponding reference information is determined according to the high-frequency QRS waveform curve to provide reference for a doctor.

In some examples, if the amplitude falling relative value is greater than or equal to a first preset threshold, and the amplitude rising relative value is greater than or equal to a second preset threshold, it is represented that the corresponding high-frequency QRS waveform curve includes a V-shaped wave band. The reference information is further determined according to the reference waveform curve including the V-shaped wave band. The first preset threshold and the second preset threshold may be customized according to empirical values. For instance, the first preset threshold is set as 45%, and the second preset threshold is set as 30%. Moreover, the first preset threshold and the second preset threshold may be dynamically determined according to parameters such as an age, a weight, and a gender of a subject, and a load grade, which is not specifically limited herein.

In some examples, if the amplitude falling relative value and the amplitude rising relative value satisfy the preset conditions, the first reference indicator is determined according to the reference waveform curve, and corresponding reference information is determined according to the first reference indicator. The first reference indicator includes at least one of amplitude rising duration, an area of a waveform falling region, and an amplitude recovery degree indicator. The amplitude rising duration refers to duration of an amplitude rising edge determined by the first reference point and the third reference point. The area of the waveform falling region is an area of a waveform falling region determined by the second reference point, the third reference point, and the reference waveform curve, and can be specifically understood as an area of a V-shaped wave band of the reference waveform curve. The amplitude recovery degree indicator is used to represent a recovery situation after amplitude falling, and can be determined by the ratio of the amplitude rising absolute value to the amplitude falling absolute value. The indicator value/parameter value of the first reference indicator may be determined as the reference information, or the reference information may be determined according to a threshold interval in which the indicator value is correspondingly located.

In some examples, if the amplitude falling relative value and the amplitude rising relative value satisfy the preset conditions, a second reference indicator is determined according to a corresponding high-frequency QRS waveform curve, and corresponding reference information is determined according to the second reference indicator. The second reference indicator includes a lead positive indicator. For instance, the reference information is determined according to a total number of high-frequency QRS waveform curves of which corresponding lead positive indicators indicate positive and corresponding amplitude falling relative values and amplitude rising relative values satisfy the preset conditions, and a number of positive leads of which lead positive indicators indicate positive.

It can be understood that the reference information may be determined in combination with the first reference indicator and the second reference indicator. For instance, the first reference information is determined on the basis of the first reference indicator, the second reference information is determined on the basis of the second reference indicator, and the corresponding reference information is obtained on the basis of the first reference information and the second reference information.

In the above analysis method for a high-frequency QRS waveform curve, a curve in a preset time period is selected from a high-frequency QRS waveform curve corresponding to exercise electrocardiogram data as a reference waveform curve. A second reference point, a first reference point, and a third reference point are selected in sequence from the reference waveform curve in a time sequence. A waveform change situation of the reference waveform curve is quantified on the basis of a root-mean-square voltage of each reference point. When it is determined that the quantified amplitude falling relative value and amplitude rising relative value satisfy the preset conditions, that is, it is determined that a waveform change situation of the reference waveform curve satisfies requirements, the reference information of the high-frequency QRS waveform curve is determined according to the reference waveform curve to provide reference for a doctor. Thus, the doctor can accurately identify a heart health status through a noninvasive method in combination with information such as clinical symptoms and/or myocardial ischemia situations. Identification accuracy of the heart health status through the noninvasive identification method can be improved.

In some examples, the reference information includes first reference information. The step that corresponding reference information is determined according to the high-frequency QRS waveform curve includes: an amplitude falling absolute value is determined on the basis of the respective root-mean-square voltages of the first reference point and the second reference point; an amplitude rising absolute value is determined on the basis of the respective root-mean-square voltages of the first reference point and the third reference point; and the first reference information is determined according to the amplitude rising absolute value and the amplitude falling absolute value.

Specifically, a difference between the root-mean-square voltage of the second reference point and the root-mean-square voltage of the first reference point is computed, and an amplitude falling absolute value is obtained. A difference between the root-mean-square voltage of the third reference point and the root-mean-square voltage of the first reference point is computed, and an amplitude rising absolute value is obtained. First reference information of a corresponding high-frequency QRS waveform curve is determined according to a ratio of the amplitude rising absolute value to the amplitude falling absolute value.

In some examples, the ratio of the amplitude rising absolute value to the amplitude falling absolute value may be understood as an amplitude recovery degree indicator for representing the establishment degree of the collateral circulation. The amplitude recovery degree indicator is positively correlated with the establishment degree of the collateral circulation. For instance, the greater the amplitude recovery degree indicator, the better the establishment degree of the collateral circulation. The amplitude recovery degree indicator may be used as the first reference information, or the first reference information may be determined according to a ratio threshold interval in which the amplitude recovery degree indicator is located. A plurality of ratio threshold intervals are pre-configured. For instance, three ratio threshold intervals from a first ratio threshold interval to a third ratio threshold interval of which reference priorities are reduced in sequence are pre-configured, for instance, greater than or equal to 0.8, greater than or equal to 0.5 and less than 0.8, and less than 0.5. If the amplitude recovery degree indicator is in the first ratio threshold interval, the first reference information is determined as "excellent". If the amplitude recovery degree indicator is in the second ratio threshold interval, the first reference information is determined as "good". If the amplitude recovery degree indicator is in the third ratio threshold interval, the first reference information is determined as "poor". For another instance, if the amplitude recovery degree indicator is 0.8, the first reference information is determined as 0.8.

In some examples, on the basis of exercise electrocardiogram data including electrocardiogram data of at least one electrocardiogram lead, a high-frequency QRS waveform curve corresponding to each electrocardiogram lead can be obtained through analysis. On the basis of the reference waveform curve of each high-frequency QRS waveform curve, first reference information corresponding to the high-frequency QRS waveform curve can be determined through the method provided in one or more examples of the disclosure. Moreover, the first reference information serves as the first reference information corresponding to the corresponding electrocardiogram lead. Thus, each electrocardiogram lead corresponds to first reference information for representing an establishment degree of collateral circulation at a myocardial position corresponding to the electrocardiogram lead.

In the above examples, the amplitude recovery degree is quantified according to the reference waveform curve. The first reference information for representing the establishment degree of the collateral circulation is determined according to the quantified amplitude recovery degree to provide reference for a doctor. Thus, the doctors can accurately identify a heart health status through a noninvasive method in combination with clinical symptoms and/or myocardial ischemia situations.

In some examples, the step that the first reference information is determined according to the amplitude rising absolute value and the amplitude falling absolute value includes: the amplitude rising duration is determined on the basis of the respective time of the first reference point and the third reference point; and the first reference information is determined according to a ratio of the amplitude rising absolute value to the amplitude falling absolute value, and the amplitude rising duration.

The amplitude rising duration refers to duration for the amplitude on the reference waveform curve to rise from the root-mean-square voltage of the first reference point to the root-mean-square voltage of the third reference point, and is used to represent the establishment degree of the collateral circulation. The amplitude rising duration is negatively correlated with the establishment degree of the collateral circulation. For instance, the longer the amplitude rising duration, the worse the establishment degree of the collateral circulation.

Specifically, a difference between time of the third reference point and time of the first reference point is computed, and the amplitude rising duration is obtained. Further, the first reference information is obtained according to the ratio of the amplitude rising absolute value to the amplitude falling absolute value, and the amplitude rising duration, or the first reference information is determined according to threshold intervals in which the ratio and the amplitude rising duration are located respectively. A plurality of duration threshold intervals are pre-configured for the amplitude rising duration.

For instance, three duration threshold intervals from the first duration threshold interval to the third duration threshold interval of which reference priorities are reduced in sequence are pre-configured, for instance, less than or equal to 1, greater than 1 and less than or equal to 2, and greater than 2, and a unit is min. If the ratio of the amplitude rising absolute value to the amplitude falling absolute value is located in the first ratio threshold interval, and the amplitude rising duration is located in the first duration threshold interval, the first reference information is determined as "excellent". If the ratio is located in the first ratio threshold interval and the amplitude rising duration is located in the second duration threshold interval, the first reference information is determined as "good", which will not be enumerated herein. For another instance, if the ratio of the amplitude rising absolute value to the amplitude falling absolute value is 0.8, and the amplitude rising duration is 1.5 min, it is determined that the first reference information includes 0.8 and 1.5 min.

In the above examples, an amplitude recovery degree and required duration are quantified on the basis of the reference waveform curve. First reference information for representing the establishment degree of the collateral circulation is determined in combination with the quantified amplitude recovery degree indicator and the amplitude rising duration to provide reference for a doctor. Thus, the doctors can accurately identify a heart health status through a noninvasive method in combination with information such as clinical symptoms and/or myocardial ischemia situations.

In some examples, the step that the first reference information is determined according to a ratio of the amplitude rising absolute value to the amplitude falling absolute value, and the amplitude rising duration includes: the area of the waveform falling region is determined according to the second reference point, the third reference point, and the reference waveform curve; and the first reference information is determined according to a ratio of the amplitude rising absolute value to the amplitude falling absolute value, the amplitude rising duration, and the area of the waveform falling region.

Specifically, a closed region defined by the second reference point, the third reference point, and the reference waveform curve is determined as a waveform falling region of the reference waveform curve. An area of the closed region is computed by using the first function, and an absolute falling area is obtained. The absolute falling area serves as an area of the waveform falling region of the reference waveform curve. Or, a closed region defined by the second reference point, the third reference point, the reference waveform curve, and a reference axis (a horizontal axis of the high-frequency QRS waveform diagram) of a root-mean-square of zero is determined as a reference region. The area of the reference region is computed by using a second function, and a reference area is obtained. A ratio of an absolute falling area to the reference area is determined as a relative falling area. The relative falling area serves as the area of the waveform falling region of the reference waveform curve. Or, the absolute falling area and the relative falling area computed through the above method are used as the area of the waveform falling region of the reference waveform curve. Further, the first reference information is comprehensively determined according to the ratio of the amplitude rising absolute value to the amplitude falling absolute value, the amplitude rising duration, and the area of the waveform falling region.

In some examples, a plurality of area threshold intervals are pre-configured for the area of the waveform falling region. For instance, three area threshold intervals from a first area threshold interval to a third area threshold interval of which reference priorities are reduced in sequence are pre-configured. If the area of the waveform falling region includes an absolute falling area and/or a relative falling area, the area threshold interval pre-configured for the waveform falling region includes an absolute area threshold interval pre-configured for the absolute falling area and/or a relative area threshold interval pre-configured for the relative falling area. Therefore, if the area of the waveform falling region is located in the first area threshold interval, the absolute falling area and/or the relative falling area included are located in corresponding area threshold intervals of the first area threshold interval respectively, which will not be repeated herein.

In some examples, the root-mean-square voltage of the third reference point is determined as a reference amplitude. A closed region defined jointly by the reference amplitude, the reference waveform curve, and the second reference point and located below the reference amplitude is determined as the waveform falling region. Thus, the area of the waveform falling region of the corresponding high-frequency QRS waveform curve is determined on the basis of the waveform falling region. In the example, the area of the waveform falling region, the amplitude rising duration, and the ratio of the amplitude rising absolute value to the amplitude falling absolute value may be combined to be used to evaluate the establishment degree of collateral circulation. The higher the reference priority of the area threshold interval configured for the waveform falling region, the greater a numerical value in the area threshold interval.

For instance, if the ratio of the amplitude rising absolute value to the amplitude falling absolute value is located in a first ratio threshold interval, the amplitude rising duration is located in a first duration threshold interval, and the area of the waveform falling region is located in a first area threshold interval, the first reference information is determined as "excellent". If the ratio is located in a second ratio threshold interval, the amplitude rising duration is located in a first duration threshold interval, and the area of the waveform falling region is located in a first area threshold interval, the first reference information is determined as "good", which will not be enumerated herein. For another instance, if the area of the waveform falling region includes a relative falling area, the ratio of the amplitude rising absolute value to the amplitude falling absolute value is 0.8, the relative falling area is 0.4, and the amplitude rising duration is 1.5 min, it is determined that the first reference information includes 0.8, 0.4, and 1.5 min. It can be understood that the first reference information may include an indicator value/parameter value corresponding to the reference indicator, and may further include a corresponding reference indicator such that indicator values of reference indicators can be distinguished.

In some examples, in one or more examples of the disclosure, the first reference information includes not only a parameter value representing the establishment degree of the collateral circulation, but also a parameter value representing a myocardial ischemia degree under the condition that the collateral circulation is established. The two types of parameter values are comprehensively determined on the basis of the ratio of the amplitude rising absolute value to the amplitude falling absolute value, the amplitude rising duration, and the area of the waveform falling region. The area of the waveform falling region to which the parameter value representing the establishment degree of the collateral circulation refers is understood as an area of a first waveform falling region. The area of the first waveform falling region is correspondingly determined by taking the root-mean-square voltage of the third reference point as a reference amplitude. The area of the waveform falling region to which the parameter value representing a myocardial ischemia degree under the condition that the collateral circulation is established refers is understood as an area of a second waveform falling region.

With regard to the area of the second waveform falling region, the root-mean-square voltage of the second reference point is determine as the reference amplitude, and a closed region defined jointly by the reference amplitude, the reference waveform curve and the third reference point and locate below the reference amplitude is determined as the waveform falling region, or a closed region defined by a line between the second reference point and the third reference point and the reference waveform curve and located below the line is determine as the waveform falling region such that the area of the second waveform falling region can be determined on the basis of the waveform falling region. The higher the reference priority of the area threshold interval configured for the area of the first waveform falling region, the greater the numerical value in the area threshold interval. The higher the reference priority of the area threshold interval configured for the area of the second waveform falling region, the less a numerical value in the area threshold interval. A processing logic for determining a corresponding parameter value on the basis of the ratio of the amplitude rising absolute value to the amplitude falling absolute value, the amplitude rising duration, and the area of the first waveform falling region (or the area of the second waveform falling region) can be obtained specifically with reference to a corresponding example in the disclosure, and will not be repeated herein.

In the above examples, the amplitude recovery degree indicator, the amplitude rising duration, and an area of the waveform falling region are quantified on the basis of the reference waveform curve. The first reference information is determined in combination with the quantified number. The first reference information can provide the establishment degree of the collateral circulation, and the myocardial ischemia degree under the condition that the collateral circulation is established to provide reference for a doctor. Thus, the doctor can accurately identify a heart health status through a noninvasive method in combination with clinical symptoms and/or myocardial ischemia situations.

In some examples, the reference information further includes second reference information. The step that corresponding reference information is determined according to the high-frequency QRS waveform curve further includes: a lead positive indicator of a corresponding electrocardiogram lead is determined according to the high-frequency QRS waveform curve; a number of positive leads is determined according to the lead positive indicator; a total number of high-frequency QRS waveform curves of which corresponding lead positive indicators indicate positive, and corresponding amplitude falling relative values and amplitude rising relative values satisfy the preset conditions is determined; and the second reference information is determined according to the total number and the number of the positive leads.

Specifically, a curve in an exercise time period is cut from a high-frequency QRS waveform curve to serve as a candidate waveform curve. A point, of which the root-mean-square voltage is greatest, on the candidate waveform curve is selected as a fourth reference point. A point, of which the root-mean-square voltage is smallest, after the fourth reference point on the candidate waveform curve is selected as a fifth reference point. A difference between a root-meansquare voltage of the fourth reference point and a root-mean-square voltage of the fifth reference point is computed, and an amplitude falling absolute value is obtained. A ratio of the amplitude falling absolute value to the root-mean-square voltage of the fourth reference point is determined as the amplitude falling relative value. A lead positive indicator of a corresponding high-frequency QRS waveform curve is determined according to the amplitude falling relative value and the amplitude falling absolute value to serve as a lead positive indicator corresponding to a corresponding electrocardiogram lead. A number of positive leads is obtained on the basis of an electrocardiogram lead of which a lead positive indicator indicates positive. High-frequency QRS waveform curves of which corresponding lead positive indicators indicate positive, and corresponding amplitude falling relative values and amplitude rising relative values satisfy the preset conditions are selected and counted. A total number of high-frequency QRS waveform curves satisfying the selection condition is obtained. The second reference information is determined according to a ratio of the total number to the number of positive leads. Specifically, the ratio of the total number to the number of the positive leads may be determined as the second reference information, or the second reference information may be determined according to a threshold interval in which the ratio is located.

It can be understood that the concept of the exercise phase in the example is different from that of the previous exercise time period. The exercise time period includes a period of time before the exercise, a period of time during the exercise and a period of time after the exercise. The period of time before the exercise is in the rest phase, the period of time during the exercise includes the entire exercise phase, and the period of time after the exercise is in the recovery phase. The period of time before the exercise, the period of time during the exercise, and the period of time after the exercise are continuous time periods. Similar to the ratio threshold interval configured for the ratio of the amplitude rising absolute value to the amplitude falling absolute value, a plurality of ratio threshold intervals are pre-configured for the ratio of the total number to the number of positive leads, and a plurality of corresponding ratio threshold intervals are configured for each of the two ratios, which will not be repeated herein. For instance, if the ratio of the total number to the number of positive leads is greater than or equal to 0.75, the second reference information is determined as "excellent".

In some examples, if the amplitude falling absolute value and the amplitude falling relative value of the high-frequency QRS waveform curve satisfy a preset lead positive condition, a lead positive indicator indicates that a corresponding electrocardiogram lead is positive. The preset lead positive condition can be customized according to actual testing situations, and can be adaptively adjusted according to an age, a gender, a height, a weight and other factors of a subject. For instance, the amplitude falling absolute value is greater than 1 uV and the amplitude falling relative value is greater than 50%, which is not specifically limited herein.

In some examples, a total number of high-frequency QRS waveform curves of which corresponding lead positive indicators indicate positive, corresponding amplitude falling relative values and amplitude rising relative values satisfy the preset conditions, and corresponding first reference information is target reference information is selected and counted, and the second reference information is determined according to the ratio of the total number to the number of positive leads. The target reference information may be self-defined according to actual requirements. For instance, the target reference information may be first reference information representing that a good collateral circulation is established, such as "excellent", or first reference information representing that a good and/or average collateral circulation is established, such as "excellent" or "good". It can be understood that if the first reference information includes an indicator value/parameter value corresponding to at least one reference indicator, whether the first reference information of each high-frequency QRS waveform curve is target reference information is determined with reference to a method for determining first reference information provided in one or more examples of the disclosure. For instance, if it is determined on the basis of the amplitude rising duration that the first reference information includes 1 min, since 1 min is located in the first duration threshold interval, it is determined that the first reference information is target reference information. In this way, the second reference information for representing an overall establishment degree of collateral circulation is determined according to a proportion of electrocardiogram leads of which corresponding lead positive indicators indicate positive, and corresponding good (or average or above) collateral circulation are established at myocardial positions in the number of positive leads to provide reference for a doctor.

In some examples, high-frequency QRS waveform curves of which corresponding lead positive indicators indicate positive, and corresponding amplitude falling relative values and amplitude rising relative values satisfy the preset conditions are selected. Statistical values corresponding to the amplitude recovery degree indicators, amplitude rising duration, and the area of the waveform falling region corresponding to the selected high-frequency QRS waveform curves are determined. According to a statistical value of at least one of the amplitude recovery degree indicator, the amplitude rising duration, and the area of the waveform falling region, the second reference information is determined through a method similar to the method for determining the first reference information. For instance, the second reference information is determined according to a duration threshold interval in which the statistical value of the amplitude rising duration is located, which will not be repeated herein. Statistical values in the example include but are not limited to sum values, average values, and maximum values.

In the above examples, in combination with the lead positive indicator of each electrocardiogram lead, a proportion of electrocardiogram leads of which corresponding lead positive indicators indicate positive, and corresponding amplitude falling relative values and amplitude rising relative values satisfy the preset conditions in electrocardiogram leads of which lead positive indicators indicate positive is evaluated. On this basis, the second reference information for representing the overall establishment degree of the collateral circulation is determined to provide reference for a doctor. Thus, a doctor can accurately identify a heart health status through a noninvasive method in combination with information such as clinical symptoms and/or myocardial ischemia situations.

In some examples, the preset conditions include: the amplitude falling relative value is greater than or equal to a first preset threshold, and the amplitude rising relative value is greater than or equal to a second preset threshold. The first preset threshold is determined by at least one of the root-mean-square voltage of the second reference point, a weight, an age, and a gender of a subject, and a load grade. The second preset threshold is determined by at least one of the root-mean-square voltage of the first reference point, a weight, an age, and a gender of a subject, and a load grade.

In some examples, the first preset threshold is dynamically determined by at least one of the root-mean-square voltage of the second reference point, the weight, the age, and the gender of the subject, and the load grade. For instance, the parameters are weighted and summed, and the corresponding first preset threshold is obtained. Similarly, the second preset threshold is dynamically determined by at least one of the root-mean-square voltage of the first reference point, and the weight, the age, and the gender of the subject, and the load grade.

In some examples, a first reference threshold and a second reference threshold are pre-configured. A first correction coefficient is dynamically determined according to at least one of the root-mean-square voltage of the second reference point, the weight, the age, the gender of the subject, and the load grade. The first reference threshold is corrected according to the first correction coefficient, and a first preset threshold is obtained. For instance, the first correction coefficient is multiplied with the first reference threshold, and the first preset threshold is obtained. The first correction coefficient is a function determined by at least one of the root-mean-square voltage of the second reference point, the weight, the age, and the gender of the subject, and the load grade. Similarly, on the basis of at least one of the root-mean-square voltage of the first reference point, the weight, the age, and the gender of the subject, and the load grade, the second reference threshold is corrected, and a second preset threshold is obtained, which will not be repeated herein.

In the above examples, preset thresholds for being compared with the amplitude falling relative value and the amplitude rising relative value in the preset conditions are dynamically determined on the basis of a user portrait (such as a root-mean-square voltage of the first reference point/the second reference point, a weight, an age, a gender, or a load grade) of a subject. Thus, a waveform change situation of the reference waveform curve in the high-frequency QRS waveform curve can be accurately quantified on the basis of a preset threshold dynamically determined. On the basis that the waveform change situation is accurately quantified, reference information representing the establishment degree of the collateral circulation is accurately analyzed to provide reference for a doctor. Thus, a doctor can accurately identify a heart health status through a noninvasive method in combination with information such as clinical symptoms and/or myocardial ischemia situations.

Figure 3:
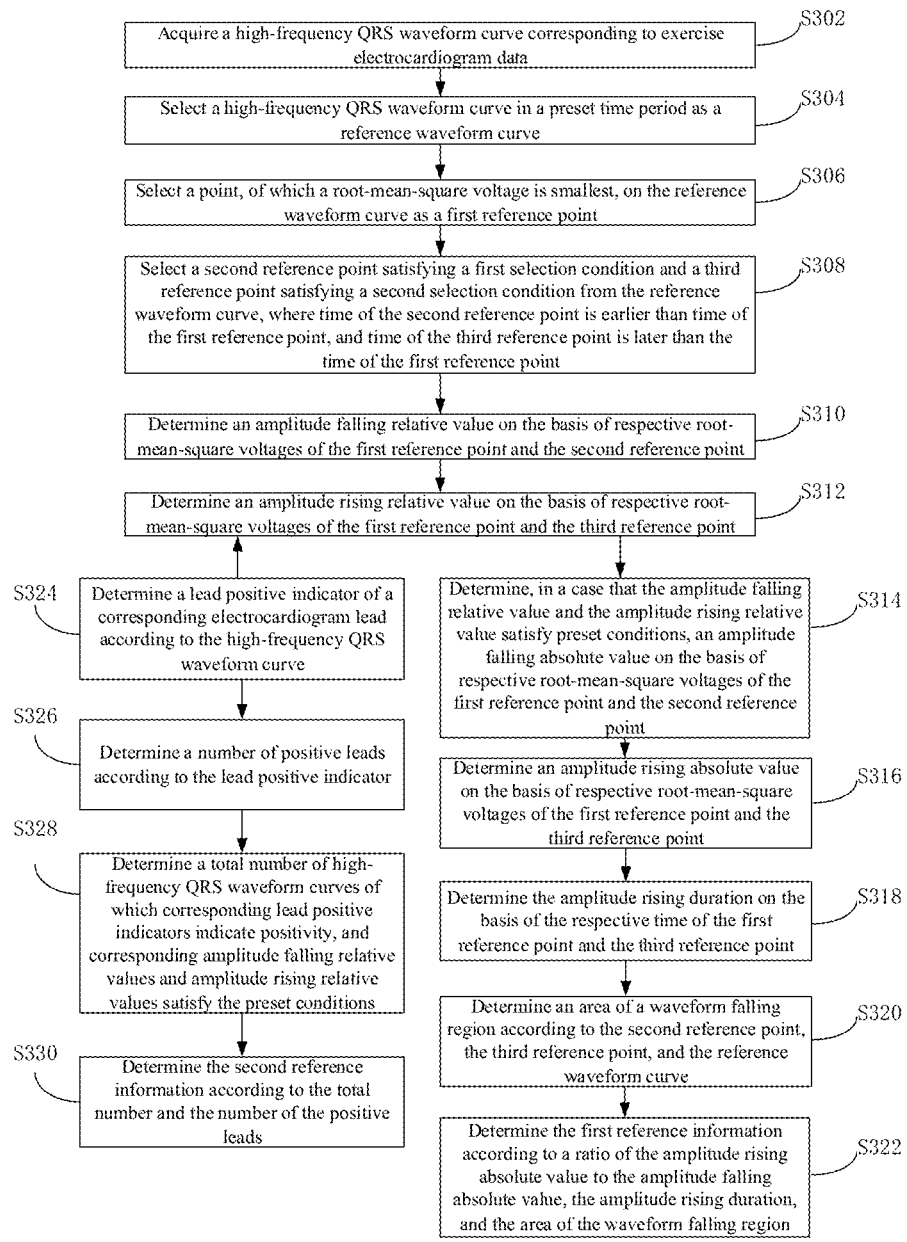
FIG. 3 is a schematic flow diagram of an analysis method for a high-frequency QRS waveform curve according to another example.

As shown in FIG. 3, in some examples, a schematic flow diagram of an analysis method for a high-frequency QRS waveform curve is provided. The method specifically includes steps as follows:

S302: a high-frequency QRS waveform curve corresponding to exercise electrocardiogram data is acquired.

S304: a high-frequency QRS waveform curve in a preset time period is selected as a reference waveform curve.

S306: a point, of which a root-mean-square voltage is smallest, on the reference waveform curve is selected as a first reference point.

S308: a second reference point satisfying a first selection condition and a third reference point satisfying a second selection condition are selected from the reference waveform curve. Time of the second reference point is earlier than time of the first reference point. Time of the third reference point is later than the time of the first reference point.

S310: an amplitude falling relative value is determined on the basis of respective root-mean-square voltages of the first reference point and the second reference point.

S312: an amplitude rising relative value is determined on the basis of respective root-mean-square voltages of the first reference point and the third reference point.

S314: an amplitude falling absolute value is determined on the basis of respective root-mean-square voltages of the first reference point and the second reference point in a case that the amplitude falling relative value and the amplitude rising relative value satisfy preset conditions.

S316: an amplitude rising absolute value is determined on the basis of respective root-mean-square voltages of the first reference point and the third reference point.

S318: the amplitude rising duration is determined on the basis of the respective time of the first reference point and the third reference point.

S320: an area of a waveform falling region is determined according to the second reference point, the third reference point, and the reference waveform curve.

S322: the first reference information is determined according to a ratio of the amplitude rising absolute value to the amplitude falling absolute value, the amplitude rising duration, and the area of the waveform falling region.

S324: a lead positive indicator of a corresponding electrocardiogram lead is determined according to the high-frequency QRS waveform curve.

S326: a number of positive leads is determined according to the lead positive indicator.

S328: a total number of high-frequency QRS waveform curves of which corresponding lead positive indicators indicate positive, and corresponding amplitude falling relative values and amplitude rising relative values satisfy the preset conditions is determined.

S330: the second reference information is determined according to the total number and the number of the positive leads.

In the above examples, according to the waveform change situation of the reference waveform curve in the high-frequency QRS waveform curve, when the waveform change situation satisfies requirements, an amplitude recovery degree and required duration, an area of a waveform falling curve, and other indicators are quantified according to the reference waveform curve, the first reference information for representing the establishment degree of the collateral circulation of the myocardial position corresponding to the corresponding electrocardiogram lead is determined on the basis of the quantified reference indicators. A lead positive indicator is quantified on the basis of the high-frequency QRS waveform curve, and a number of positive leads is determined. Second reference information for representing the establishment degree of the overall collateral circulation of the heart is determined according to a proportion of a total number of electrocardiogram leads of which lead positive indicators indicate positive, and the waveform change situation satisfies requirements in the number of positive leads. Thus, the doctor can identify a heart health status in combination with clinical symptoms and/or myocardial ischemia situations with reference to the first reference information and the second reference information. Identification accuracy of the heart health status through the noninvasive identification method can be improved.

It can be understood that in one or more examples of the disclosure, a number of threshold intervals and interval values provided for the reference indicator are only used as instances, and are not used for specific limitation.

It should be understood that although all steps in flow diagrams of FIG. 1 and FIG. 3 are shown in sequence as indicated by arrows, these steps are not certainly executed in sequence in orders indicated by the arrows. Unless explicitly stated herein, these steps are not strictly limited to orders in which they are executed, and these steps can be executed in other orders. Moreover, at least some steps in FIG. 1 and FIG. 3 can include a plurality of steps or a plurality of phases. These steps or phases are not certainly executed at the same time, but can be executed at different time. These steps or phases are not certainly executed in sequence, but can be executed in turn or alternatively with other steps or at least part of steps or phases of other steps.

Figure 4:
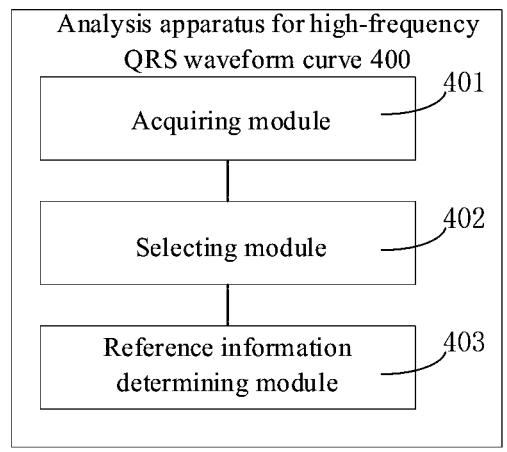
FIG. 4 is a structural block diagram of an analysis apparatus for a high-frequency QRS waveform curve according to one or more examples.

In some examples, as shown in FIG. 4, an analysis apparatus for a high-frequency QRS waveform curve 400 is provided. The apparatus includes an acquiring module 401, a selecting module 402, and a reference information determining module 403.

The acquiring module 401 is used to acquire a high-frequency QRS waveform curve corresponding to exercise electrocardiogram data.

The selecting module 402 is used to select a high-frequency QRS waveform curve in a preset time period as a reference waveform curve.

The selecting module 402 is further used to select a point, of which a root-mean-square voltage is smallest, on the reference waveform curve as a first reference point.

The selecting module 402 is further used to select a second reference point satisfying a first selection condition and a third reference point satisfying a second selection condition from the reference waveform curve. Time of the second reference point is earlier than time of the first reference point. Time of the third reference point is later than the time of the first reference point.

The reference information determining module 403 is used to determine an amplitude falling relative value on the basis of respective root-mean-square voltages of the first reference point and the second reference point.

The reference information determining module 403 is further used to determine an amplitude rising relative value on the basis of respective root-mean-square voltages of the first reference point and the third reference point.

The reference information determining module 403 is further used to determine corresponding reference information according to the high-frequency QRS waveform curve in a case that the amplitude falling relative value and the amplitude rising relative value satisfy preset conditions.

In some examples, the reference information includes first reference information. The reference information determining module 403 is further used to determine an amplitude falling absolute value on the basis of the respective root-mean-square voltages of the first reference point and the second reference point, determine an amplitude rising absolute value on the basis of the respective root-mean-square voltages of the first reference point and the third reference point, and determine the first reference information according to the amplitude rising absolute value and the amplitude falling absolute value.

In some examples, the reference information determining module 403 is further used to determine the amplitude rising duration on the basis of the respective time of the first reference point and the third reference point; and determine the first reference information according to a ratio of the amplitude rising absolute value to the amplitude falling absolute value, and the amplitude rising duration.

In some examples, the reference information determining module 403 is further used to determine the area of the waveform falling region according to the second reference point, the third reference point, and the reference waveform curve; and determine the first reference information according to a ratio of the amplitude rising absolute value to the amplitude falling absolute value, the amplitude rising duration, and the area of the waveform falling region.

In some examples, the reference information further includes second reference information. The reference information determining module 403 is further used to determine a lead positive indicator of a corresponding electrocardiogram lead according to the high-frequency QRS waveform curve, determine a number of positive leads according to the lead positive indicator, determine a total number of high-frequency QRS waveform curves of which corresponding lead positive indicators indicate positive, and corresponding amplitude falling relative values and amplitude rising relative values satisfy the preset conditions, and determine the second reference information according to the total number and the number of the positive leads.

In some examples, the preset conditions include: the amplitude falling relative value is greater than or equal to a first preset threshold, and the amplitude rising relative value is greater than or equal to a second preset threshold. The first preset threshold is determined by at least one of the root-mean-square voltage of the second reference point, a weight, an age, and a gender of a subject, and a load grade. The second preset threshold is determined by at least one of the root-mean-square voltage of the first reference point, a weight, an age, and a gender of a subject, and a load grade.

Specific limitation on the analysis apparatus for a high-frequency QRS waveform curve can be obtained with reference to the limitation on the analysis method for a high-frequency QRS waveform curve mentioned above, and will not be repeated herein. Each module in the above analysis apparatus for a high-frequency QRS waveform curve can be wholly or partially implemented by software, hardware and their combinations. The above modules may be embedded in or independent of a processor of a computer device in a hardware form, or may be stored in a memory of a computer device in a software form such that operations corresponding to the above modules can be called and executed by the processor.

Figure 5:
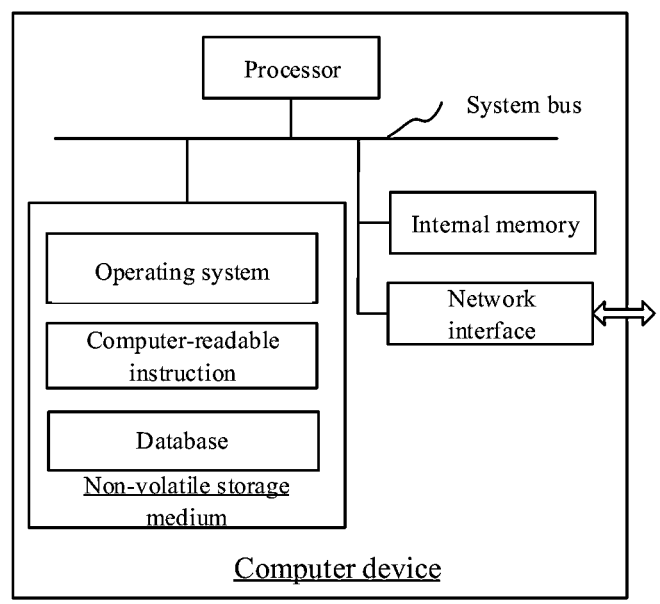
FIG. 5 is an internal structural diagram of a computer device according to one or more examples.

In some examples, a computer device is provided. The computer device may be a server, and an internal structural diagram of the computer device may be as shown in FIG. 5. The computer device includes a processor, a memory, and a network interface which are connected by a system bus. The processor of the computer device is used to provide computation and control capabilities. The memory of the computer device includes a non-volatile storage medium and an internal memory. The non-volatile storage medium stores an operating system, a computer-readable instruction, and a database. The internal memory provides an environment for execution of the operating system and the computer-readable instruction in the non-volatile storage medium. The database of the computer device is used to store the high-frequency QRS waveform curve corresponding to the exercise electrocardiogram data. The network interface of the computer device is used to be in communication with an external terminal through a network connection. When the computer-readable instruction is executed by the processor, an analysis method for a high-frequency QRS waveform curve can be implemented.

Those skilled in the art can understand that the structure shown in FIG. 5 is merely a block diagram of part of the structure related to the solution of the disclosure, and does not constitute a limitation on the computer device to which the solution of the disclosure is applied. A specific computer device can include more or less components than those shown in the figure, or combine some components, or have different component arrangements.

In some examples, a computer device is provided. The computer device includes a memory and one or more processors. A computer-readable instruction is stored in the memory. When the computer-readable instruction is executed by the processors, the steps of the analysis method for a high-frequency QRS waveform curve provided in any one of examples of the disclosure are implemented.

In some examples, one or more non-volatile storage media storing computer-readable instructions are provided. When the computer-readable instructions are executed by one or more processors, the one or more processors are caused to implement the steps of the analysis method for a high-frequency QRS waveform curve provided in any one of examples of the disclosure.

Those of ordinary skill in the art can understand that all or part of processes for implementing the methods in the above examples may be implemented by a computer-readable instruction instructing related hardware. The computer-readable instruction may be stored in a non-volatile computer-readable storage medium. When the computer-readable instruction is executed, processes of examples of the above methods can be included. Any reference to a memory, storage, a database, or other media used in examples provided in the disclosure may include at least one of a non-volatile memory and a volatile memory. The non-volatile memory may include a read-only memory (ROM), a magnetic tape, a floppy disk, a flash memory, or an optical memory, etc. The volatile memory may include a random access memory (RAM) or an external cache memory. By way of illustration and not limitation, the RAM may be in a variety of forms, such as a static random access memory (SRAM) or a dynamic random access memory (DRAM).

Various technical features in the above examples can be arbitrarily combined. To simplify description, not all possible combinations of the various features of the above examples are described. However, if only the combinations of these technical features do not conflict, the combinations shall be considered to fall within the scope of the description.

The above examples merely show some embodiments of the disclosure, and are specifically described in details, but cannot be interpreted as limiting the scope of the patent for the invention as a result. It should be noted that several variations and improvements can be made by those of ordinary skill in the art without departing from the concept of the disclosure, and should all fall within the scope of protection of the disclosure. Therefore, the scope of protection of the patent for the disclosure shall be subject to the appended claims.

The invention claimed is:

1. A computer-implemented method for improving real-time assessment of collateral circulation during an exercise stress test using high-frequency QRS waveform analysis, the method comprising:
   acquiring, during the exercise stress test, multi-lead exercise electrocardiogram data via a stress-test electrocardiograph system, wherein the stress-test electrocardiograph system includes an electrocardiogram (ECG) acquisition front-end coupled to electrodes and a display;
   for each lead, generating a high-frequency QRS waveform curve corresponding to the exercise electrocardiogram data by segmenting the data into sliding windows aligned to QRS complexes, band-pass filtering each window to isolate a high-frequency QRS component, averaging aligned complexes, and computing, for each window, a root-mean-square (RMS) voltage to form the high-frequency QRS waveform curve;
   selecting, for each lead, a high-frequency QRS waveform curve in a preset time period as a reference waveform curve representing an establishment situation of collateral circulation, wherein the preset time period is a time interval that takes a starting point of an exercise phase as a starting time point and has a duration of three minutes;
   selecting, on the reference waveform curve, a first reference point at which an RMS voltage is smallest within the preset time period;
   selecting, from the reference waveform curve, (i) a second reference point that is a starting point of the preset time period and (ii) a third reference point that is a first inflection point occurring after the first reference point;
   determining an amplitude falling relative value based on respective RMS voltages of the first reference point and the second reference point and determining an amplitude rising relative value based on respective RMS voltages of the first reference point and the third reference point;
   responsive to the amplitude falling relative value being greater than or equal to a first preset threshold and the amplitude rising relative value being greater than or equal to a second preset threshold, determining corresponding reference information according to the reference waveform curve, wherein the reference information comprises
   first reference information determined from at least one first reference indicator selected from: an amplitude recovery degree indicator, an amplitude rising duration defined as a duration for an amplitude on the reference waveform curve to rise from the RMS voltage of the first reference point to the RMS voltage of the third reference point, and an area of a waveform falling region; and
   causing the stress-test electrocardiogram to present, on the display during the exercise phase, a classification of an establishment degree of collateral circulation derived from the first reference information.

2. The method according to claim 1, wherein:
   the first reference indicator comprises the amplitude recovery degree indicator; and
   the determining a first reference indicator according to the reference waveform curve corresponding to the high-frequency QRS waveform curve comprises:
      determining an amplitude falling absolute value based on the respective RMS voltages of the first reference point and the second reference point,
      determining an amplitude rising absolute value based on the respective RMS voltages of the first reference point and the third reference point, and
      determining the amplitude recovery degree indicator according to a ratio of the amplitude rising absolute value to the amplitude falling absolute value.

3. The method according to claim 2, wherein:
   the first reference indicator further comprises the amplitude rising duration; and
   the determining a first reference indicator according to the reference waveform curve corresponding to the high-frequency QRS waveform curve further comprises:

determining the amplitude rising duration based on the respective time of the first reference point and the third reference point.

4. The method according to claim 3, wherein:
the first reference indicator further comprises the area of the waveform falling region; and
the determining a first reference indicator according to the reference waveform curve corresponding to the high-frequency QRS waveform curve comprises:
determining the area of the waveform falling region according to the second reference point, the third reference point, and the reference waveform curve.

5. The method according to claim 1, wherein:
the reference information further comprises second reference information;
and the determining corresponding reference information according to the high-frequency QRS waveform curve comprises:
determining a lead positive indicator of a corresponding electrocardiogram lead according to the high-frequency QRS waveform curve, determining a number of positive leads according to the lead positive indicator, determining a total number of high-frequency QRS waveform curves of which corresponding lead positive indicators indicate positive, and corresponding amplitude falling relative values and amplitude rising relative values satisfy the preset conditions, and determining the second reference information according to the total number and the number of the positive leads.

6. The method according to claim 2, wherein:
the reference information further comprises second reference information; and
the determining corresponding reference information according to the high-frequency QRS waveform curve comprises:
determining a lead positive indicator of a corresponding electrocardiogram lead according to the high-frequency QRS waveform curve,
determining a number of positive leads according to the lead positive indicator,
determining a total number of high-frequency QRS waveform curves of which corresponding lead positive indicators indicate positive, and corresponding amplitude falling relative values and amplitude rising relative values satisfy the preset conditions, and
determining the second reference information according to the total number and the number of the positive leads.

7. The method according to claim 3, wherein the reference information further comprises second reference information; and the determining corresponding reference information according to the high-frequency QRS waveform curve comprises:
determining a lead positive indicator of a corresponding electrocardiogram lead according to the high-frequency QRS waveform curve;
determining a number of positive leads according to the lead positive indicator;
determining a total number of high-frequency QRS waveform curves of which corresponding lead positive indicators indicate positive, and corresponding amplitude falling relative values and amplitude rising relative values satisfy the preset conditions; and
determining the second reference information according to the total number and the number of the positive leads.

8. The method according to claim 4, wherein the reference information further comprises second reference information; and the determining corresponding reference information according to the high-frequency QRS waveform curve comprises:
determining a lead positive indicator of a corresponding electrocardiogram lead according to the high-frequency QRS waveform curve;
determining a number of positive leads according to the lead positive indicator;
determining a total number of high-frequency QRS waveform curves of which corresponding lead positive indicators indicate positive, and corresponding amplitude falling relative values and amplitude rising relative values satisfy the preset conditions; and
determining the second reference information according to the total number and the number of the positive leads.

9. The method according to claim 1, wherein generating the high-frequency QRS waveform curve comprises aligning QRS complexes within sliding windows, averaging the aligned complexes, band-pass filtering to extract a high-frequency QRS component, and computing an RMS voltage for each window.

10. The method according to claim 1, wherein the first preset threshold and the second preset threshold are determined based on subject-specific parameters comprising at least one of: an RMS voltage of the first reference point, an RMS voltage of the second reference point, patient weight, patient age, patient gender, and an exercise load grade.

11. A computer device for improving real-time assessment of collateral circulation during an exercise stress test using high-frequency QRS waveform analysis, the computer device comprising
an ECG acquisition front-end,
a display, a memory, and
one or more processors, wherein the memory stores computer-readable instructions that, when executed by the one or more processors, cause the one or more processors to
acquire, during the exercise stress test, multi-lead exercise electrocardiogram data via the ECG acquisition front-end;
for each lead, generate a high-frequency QRS waveform curve by segmenting the data into sliding windows aligned to QRS complexes, band-pass filtering each window to isolate a high-frequency QRS component, averaging aligned complexes, and computing, for each window, an RMS voltage to form the high-frequency QRS waveform curve;
select, for each lead, as a reference waveform curve, the high-frequency QRS waveform curve in a preset time period that begins at a starting point of an exercise phase and has a duration of three minutes;
select, on the reference waveform curve, a first reference point at which an RMS voltage is smallest within the preset time period;
select, from the reference waveform curve, (i) a second reference point that is a starting point of the preset time period and (ii) a third reference point that is a first inflection point occurring after the first reference point;
determine an amplitude falling relative value based on respective RMS voltages of the first point and the second reference point and
determine an amplitude rising relative value based on respective RMS voltages of the first and third reference points;

responsive to both relative values satisfying respective preset thresholds, determine reference information including first reference information determined from at least one indicator selected from: an amplitude recovery degree indicator, an amplitude rising duration, and an area of a waveform falling region; and cause the display to present, during the exercise phase, a classification of an establishment degree of collateral circulation derived from the first reference information.

12. The computer device according to claim 11, wherein: the first reference information comprises the amplitude recovery degree indicator; and
when the computer-readable instruction further cause the one or more processors to:
   determining an amplitude falling absolute value based on the respective RMS voltages of the first reference point and the second reference point,
   determining an amplitude rising absolute value based on the respective RMS voltages of the first reference point and the third reference point, and
   determining the amplitude recovery degree indicator according to a ratio of the amplitude rising absolute value to the amplitude falling absolute value.

13. The computer device according to claim 12, wherein: the first reference information further comprises the amplitude rising duration; and
when the instructions further cause the one or more processors to:
   determining the amplitude rising duration based on the respective time of the first reference point and the third reference point.

14. The computer device according to claim 13, wherein: the first reference information further comprises the area of the waveform falling region; and
when executing the computer-readable instruction, the processor further executes steps as follows:
   determining the area of the waveform falling region according to the second reference point, the third reference point, and the reference waveform curve.

15. The computer device according to claim 11, wherein: the reference information further comprises second reference information; and when the instructions further cause the one or more processors to:
   determine a lead positive indicator of a corresponding electrocardiogram lead according to the high-frequency QRS waveform curve,
   determine a number of positive leads according to the lead positive indicator,
   determine a total number of high-frequency QRS waveform curves of which corresponding lead positive indicators indicate positive, and corresponding amplitude falling relative values and amplitude rising relative values satisfy the preset conditions, and
   determine the second reference information according to the total number and the number of the positive leads.

16. A non-transitory computer-readable storage media storing instructions for improving real-time assessment of collateral circulation during an exercise stress test using high-frequency QRS waveform analysis, the instructions when executed by one or more processors of a stress-test electrocardiograph system, cause the stress-test electrocardiograph system to perform a method comprising:
   acquiring, during the exercise stress test, multi-lead exercise electrocardiogram data, wherein the stress-test electrocardiogram includes an electrocardiogram (ECG) acquisition front-end coupled to electrodes and a display;
   for each lead, generating a high-frequency QRS waveform curve by segmenting the data into sliding windows aligned to QRS complexes, band-pass filtering each window to isolate a high-frequency QRS component, averaging aligned complexes, and computing, for each window, an RMS voltage to form the high-frequency QRS waveform curve;
   selecting, for each lead, as a reference waveform curve, the high-frequency QRS waveform curve in a preset time period that begins at a starting point of an exercise phase and has a duration of three minutes;
   selecting, on the reference waveform curve, a first reference point at which an RMS voltage is smallest within the preset time period;
   selecting, from the reference waveform curve, (i) a second reference point that is a starting point of the preset time period and (ii) a third reference point that is a first inflection point occurring after the first reference point;
   determining an amplitude falling relative value based on respective RMS voltages of the first and second reference points and determine an amplitude rising relative value based on respective RMS voltages of the first and third reference points;
   responsive to both relative values satisfying respective preset thresholds, determining first reference information
   from at least one indicator selected from: an amplitude recovery degree indicator, an amplitude rising duration, and an area of a waveform falling region; and
   causing the stress-test electrocardiograph system to present, on the display during the exercise phase, a classification of an establishment degree of collateral circulation derived from the first reference information.

17. The non-transitory computer-readable storage media according to claim 16, wherein:
the first reference information comprises the amplitude recovery degree indicator; and
when the method further comprises:
   determining an amplitude falling absolute value based on the respective RMS voltages of the first reference point and the second reference point,
   determining an amplitude rising absolute value based on the respective RMS voltages of the first reference point and the third reference point, and
   determining the amplitude recovery degree indicator according to a ratio of the amplitude rising absolute value to the amplitude falling absolute value.

18. The non-transitory computer-readable storage media according to claim 17, wherein:
the first reference information further comprises the amplitude rising duration; and
when the method further includes:
   determining the amplitude rising duration based on the respective time of the first reference point and the third reference point.

19. The non-transitory computer-readable storage media according to claim 18, wherein:
the first reference information further comprises the area of the waveform falling region; and
when the method further includes:
   determining the area of the waveform falling region according to the second reference point, the third reference point, and the reference waveform curve.

20. The non-transitory computer-readable storage media according to claim 16, wherein:
- the reference information further comprises second reference information; and
- the method further includes:
    - determining a lead positive indicator of a corresponding electrocardiogram lead according to the high-frequency QRS waveform curve,
    - determining a number of positive leads according to the lead positive indicator,
    - determining a total number of high-frequency QRS waveform curves of which corresponding lead positive indicators indicate positive, and corresponding amplitude falling relative values and amplitude rising relative values satisfy the preset conditions, and
    - determining the second reference information according to the total number and the number of the positive leads.

* * * * *